(12) United States Patent  
Becker et al.

(10) Patent No.: US 8,972,962 B2
(45) Date of Patent: Mar. 3, 2015

(54) INFRASTRUCTURE SERVICE ARCHITECTURE FOR APPLICATIONS

(71) Applicants: Detlef Becker, Möhrendorf (DE); Lutz Dominick, Eggolsheim (DE); Karlheinz Dorn, Kalchreuth (DE); Andreas Siwick, Erlangen (DE)

(72) Inventors: Detlef Becker, Möhrendorf (DE); Lutz Dominick, Eggolsheim (DE); Karlheinz Dorn, Kalchreuth (DE); Andreas Siwick, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 156 days.

(21) Appl. No.: 13/676,392

(22) Filed: Nov. 14, 2012

(65) Prior Publication Data
US 2013/0074053 A1 Mar. 21, 2013

Related U.S. Application Data

(62) Division of application No. 11/976,803, filed on Oct. 29, 2007, now Pat. No. 8,356,280.

(30) Foreign Application Priority Data

Oct. 30, 2006 (DE) .............................. 102006051186

(51) Int. Cl.
*G06F 9/45* (2006.01)
*G06F 9/54* (2006.01)

(52) U.S. Cl.
CPC . *G06F 9/547* (2013.01); *G06F 8/44* (2013.01)
USPC ........................... 717/162; 717/140; 717/165

(58) Field of Classification Search
CPC .......................................................... G06F 8/41
USPC .................................................. 717/140–167
See application file for complete search history.

(56) References Cited

U.S. PATENT DOCUMENTS

| 5,742,757 | A | 4/1998 | Hamadani et al. |
| 6,012,081 | A | 1/2000 | Dorn et al. |
| 6,330,710 | B1 | 12/2001 | O'Neil et al. |
| 6,502,079 | B1 | 12/2002 | Ball et al. |
| 6,609,246 | B1 * | 8/2003 | Guhr et al. ................... 717/103 |
| 6,757,720 | B1 | 6/2004 | Weschler, Jr. |
| 6,810,522 | B2 * | 10/2004 | Cook et al. .................... 719/316 |
| 7,287,037 | B2 | 10/2007 | An et al. |

(Continued)

OTHER PUBLICATIONS

Habermann, A. Nico, and David Notkin. "Gandalf: Software development environments." Software Engineering, IEEE Transactions on 12 (1986), pp. 1117-1127.*

(Continued)

*Primary Examiner* — Satish Rampuria
(74) *Attorney, Agent, or Firm* — Harness, Dickey & Pierce, P.L.C.

(57) ABSTRACT

A mechanism is disclosed for operating local version-independent service program code for infrastructure services, wherein the mechanism is automatically and optionally linked to a central, remote service infrastructure, and wherein both an online and an offline processing mode is included and automatically supported, and wherein the mechanism is embedded in a generic runtime environment. In at least one embodiment, it contains service program code implemented in the runtime environment for calling by way of the application program code with standardized interfaces, wherein the service program code is intended for the provision of functionalities for predetermined services that an application program code can use.

3 Claims, 1 Drawing Sheet

(56) References Cited

U.S. PATENT DOCUMENTS

| | | | |
|---|---|---|---|
| 7,340,721 B1* | 3/2008 | Bailey | 717/109 |
| 7,380,242 B2* | 5/2008 | Alaluf | 717/148 |
| 7,917,888 B2* | 3/2011 | Chong et al. | 717/102 |
| 2004/0268293 A1* | 12/2004 | Woodgeard | 717/101 |
| 2006/0101398 A1* | 5/2006 | Schepers et al. | 717/120 |
| 2006/0179058 A1 | 8/2006 | Bram et al. | |
| 2006/0248016 A1 | 11/2006 | Ginter et al. | |

OTHER PUBLICATIONS

Dean, Jeffrey, David Grove, and Craig Chambers. "Optimization of object-oriented programs using static class hierarchy analysis." ECOOP'95—Object-Oriented Programming, 9th European Conference, Aarhus, Denmark, Aug. 7-11, 1995. Springer Berlin Heidelberg, 1995, pp. 77-101.*

Medina-Mora, Raul, and Peter H. Feiler. "An incremental programming environment." IEEE Transactions on Software Engineering 7.5 (1981), pp. 472-482.*

Office Action for corresponding Chinese patent application No. 200710166872.5 dated Sep. 26, 2012 (with English translation).

Office Action for corresponding Chinese patent application No. 200710166872.5 dated Mar. 22, 2013 (with English translation).

Papazoglou et al., Web Services Management: A Survey, 2005 Published by the IEEE, pp. 58-64.

Covington et al., A Context-Aware Security Architecture for Emerging Applications, College of Computing Georgia Institute of Technology, pp. 1-10.

Chawathe et al., Scattercast: an architecture for internet broadcast distribution as an infrastructure service, University of California, 2000, pp. 1-144.

Microsoft's Application Block: Enterprise Library for .NET Framework 1.1, on the internet: http://msdn2.microsoft.com/en-us/library/ms954836, especially: "Caching Application Block" and "Configuration Application Block," research on Jan. 10, 2007.

Microsoft's Application Block: Smart Client Offline Application Block, on the internet: http://msdn.microsoft.com/library/default.asp?url=library/en-us/dnpag/html/offline.asp, researched on Jan. 10, 2007.

Microsoft's Application Block: User Interface Process Application Block, on the internet: http://msdn.microsoft.com/library/default.asp?url=/library/en-us/dnbda/html/uip.asp, researched on Jan. 10, 2007.

Smart Client Offline Application Block, Microsoft Corporation, Feb. 2004, http://msnd2.microsoft.com/en/-us/library/ms998439.aspx.

Shashank Varshney: Creating Eclipse plug-ins, HP: Jul. 2003 http://devresource.hp.com/drc./technical_articles/ePlugin/index/jsp?jumpid=reg_R1002_USEN.

Msdn2; Smart Client Offline Application Block; 2007 Microsoft Corp., Others, 2007.

Borland, S. 37, <techpubs.borland.com/together/tvs2006/EN/userGuide.pdf>; others, 2006.

German Office Action dated Jul. 25, 2007.

German Office Action dated Jan. 18, 2008.

German Office Action dated Apr. 18, 2008.

* cited by examiner

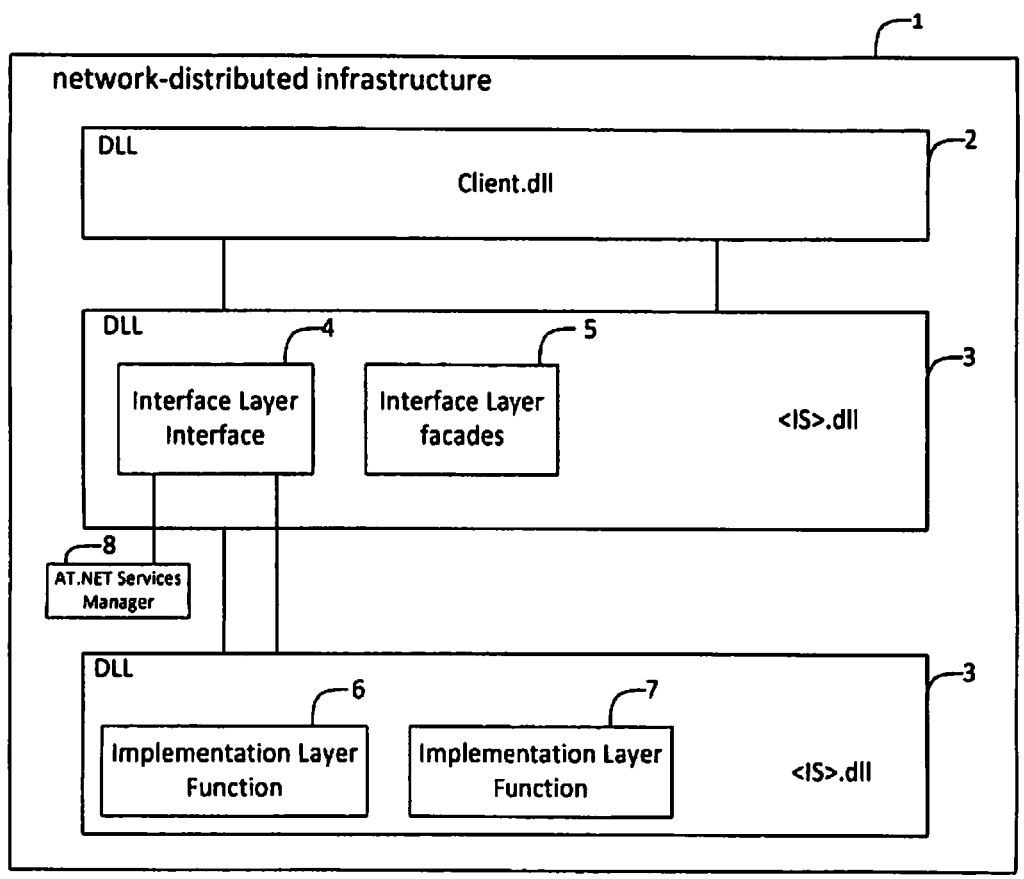

INFRASTRUCTURE SERVICE ARCHITECTURE FOR APPLICATIONS

PRIORITY STATEMENT

This application is a divisional of and claims priority under 35 U.S.C. §§120/121 to U.S. patent application Ser. No. 11/976,803 filed on Oct. 29, 2007, issued as U.S. Pat. No. 8,356,280 on Jan. 15, 2013, which claims priority under 35 U.S.C. §119 on German patent application number DE 10 2006 051 186.7 filed on Oct. 30, 2006. The disclosures of each of the above applications are incorporated herein by reference.

FIELD

Embodiments of the invention generally relate to an infrastructure service architecture for applications, such as an application container for example, as well as to systems and mechanisms for their programming realization.

BACKGROUND

Applications (computer programs) make use of a large number of different services which can be made available to them from outside the actual program objects of an application. The nature of these services varies widely, ranging for example from communication management for the communication between different applications, to security services such as authentication and authorization, to error management, or to services concerned with the creation of usage profiles of parts of the application. To date these services have either been implemented directly and specifically within the program code, and were thus available only within said code, or they were implemented entirely outside a program code, so that program code had to access these services realized as external objects with exact knowledge of the interfaces and by calling numerous individual executables for all available services.

SUMMARY

In at least one embodiment, the invention is direct to the elimination of too highly specific an adaptation within an application as well as of explicit definition of the necessary connections of components.

In particular, in at least one embodiment, a method is disclosed for operating local version-independent service program code for infrastructure services, wherein the method is automatically and optionally linked to a central, remote service infrastructure, and includes and automatically supports both an online and an offline processing mode, wherein the method is embedded in a generic runtime environment; and contains service program code implemented in the runtime environment for calling by means of the application program code with standardized interfaces, wherein the service program code is intended for the provision of functionalities for predetermined services that the application program code can use.

In the context of embodiments of the present invention, the term "mechanism" is understood to mean a product, a method and/or a system for providing a corresponding functionality. It may therefore be either a hardware-based device or a software-based method which realizes the essential features according to embodiments of the invention.

In particular, a mechanism is understood to refer to the logical structure of software components including the interaction and involvement of operating system-relevant components, while an application container is an application that, in addition to the actual program code for implementing the functionality, also contains largely standardized parts that are essential for the executability of the program code implementing the functionality in a given environment such as an operating system or an application software family environment.

The definition of the term application container as used here corresponds to the "syngo.NET" system of Siemens AG, Germany in the medical technology environment; syngo.NET should be seen as only one example framework for a specific realization of embodiments of the invention disclosed herein, and other environments may also be used for a realization. According to embodiments of the invention, the application container comprises the runtime environment which includes some basic functionalities (execution or initiating execution of the functionality program code), and a service program code with standardized interfaces implemented in the runtime environment.

Standardized interfaces refer to interfaces that are identical in all application containers of the architecture and can thus be used by the application program code in a uniform manner.

The service program code provides functionalities for predetermined services that an application program code can access, by calling the respective function or object, or using another customary mechanism for the interaction of programs.

It is also possible to provide a standardized interface for all types of implemented services, which can greatly simplify the program logic of the application program code.

In its entirety, the service program code can implement the functionality of the service or services within the container itself, so that the entire service program code is realized as part of the application container executable. Alternatively, the service program code can also access via call interfaces functionalities of the services implemented externally to the container; a standardized interface can also be provided here within the container as well.

It is particularly preferred if the container is designed with runtime environment, application program code and service program code as a single, executable file (executable).

In another example embodiment, the service program code is integrated in the runtime environment in the same way for each predetermined service of the contained services. This results in an even greater standardization beyond simply an interface definition.

Within the context of at least one embodiment of the invention, numerous different services may be implemented in the container or be referenced from the latter.

One of the predetermined services may for instance relate to the communication between different application program codes in the same or different containers and/or the communication between different application program codes in the same or different modules (task, components, activities) of application program code within a container.

The design of communication strategies requires definitions relating to how components communicate with one another within an application or activity. The communication strategy covers such matters as client/server request/response protocols, event-based communication such as also general job management processing, based on a general command handling design pattern. Synchronicity and message formats are likewise a fundamental aspect here. Optimal efficiency is achieved if a single design pattern can solve both the handling of client/server commands and batch job management with the same underlying implementation. According to embodiments of the invention, therefore, the differences lie between different deployments of a common job management "machine" contained in the service program code:
- between several components within a single process running on one machine;
- between several components deployed in several processes on the same machine;
- between several components deployed in several processes on several machines.

The solution here is to separate the communication infrastructure from the components, where the service is independent of requests and responses.

Another of the predetermined services may be the security management of application program code. Security management refers here to all aspects that ensure that a user is authorized to use the system at all, and to access certain services and programs.

The design of the security management strategy requires definitions relating to how applications and activities are managed in order to solve security and privacy problems. The security management strategy covers such problems as authentication, authorization and the recording of actions. The security management can thus include the authentication of users, that is to say determining their identity on a particular computer or in an environment of the container. The security may be implemented on a task level in a role-based manner and not functionality-dependent within the functionality of the task. For this reason, the implementation should be part of the framework and be shielded from the application logic (application program code).

The Microsoft "Application Block, Authentication and Profile" is available as part of the "Enterprise Library" under the Microsoft Windows operating system for the specific implementation of this functionality for example. "Directly Services" are provided by Microsoft Active Directory or a similar LDAP-compatible service. In addition, identity management services can be used to provide master user index functionality in large clinic environments for medical imaging systems.

The authentication defines the reliable identification of users for the given context. The following principles apply:
- user management which is supported by Windows;
- certificate-based authentication in a manner compatible with the application environment, for example with DICOM;
- relocation of users, as supported by Active Directory;
- individual logging on and context parts (e.g. GSM ABC).

In another example embodiment, the security management for specific users includes the authorization of access rights to functionalities of the container and/or of data provided via the container.

The authorization defines the access rights of users to functionality (privileges) or data and authorizations in the overall system, for example syngo.NET. The following principles apply here:
- task-specific and role-based security, for example based on the Microsoft A&P Application Block (part of the "Enterprise Library");
- code access security represents new challenges for the "zero admin" of downloadable code.

Online/offline token management is used, for example as defined by SCOB (SCOB: smart, or adaptive, client offline block).

Further central token management can be supported by the A&A ABC component.

In another example embodiment, the security management may alternatively or additionally comprise the recording of actions performed or initiated by users within the container, or application container respectively. This approach, which is also referred to as "auditing", tracks users and business activity in applications and makes this information available in central or local audit trails. The following principles may be applied here:
- online/offline audit trail management, as supported by SCOB;
- offline: use of an outbound queue to store the trail;
- online: use of SCOB-based auditing;
- central audit trail management, is supported by the SAT ABC component.

To implement security management it is possible to create user profiles containing information about users and their custom adaptation to the applications. The following principles apply here:
- the profiles may be based on the Microsoft A&P application block (part of the "Enterprise Library");
- the online/offline profile management can be supported by SCOB;
- offline: use of an outbound queue to store profiles;
- online: use of SCOB-based profiles;
- Active Directory-supported "roaming" of user profiles in the event of relocations.

In another example embodiment, one of the predetermined services is the configuration management of the application program code and/or of the container for defining and/or modifying a configuration thereof.

Applications require configuration data in order to function correctly. Settings that modify the behavior of the strategy are considered to be configuration data that can be stored in a central store as part of a remote service architecture.

Configuration data can be held in a database, such as XML configuration files for example, with the user, in the application or locally (computer). A custom configuration may be defined using Microsoft config.NET for example and the associated service components may be defined and accessed. The Microsoft "Enterprise Library" contains the configuration application block that can be used, for example, for the syngo.NET configuration. User profiles should rather be used for the front-end (graphical user interface) functionality and can be supported by user-specific configuration entries that can be passed on (roamed) by the underlying user management and the directory services.

Specific configuration services will now be presented.

User-specific configuration values:

The following restrictions apply to user-specific settings here:
- only applicable to presentation logic of applications;
- there are numerous possibilities and a great potential for a generic "InfoPath" user interface to replace the hitherto customary individual configurable applications.

Default Configuration Values:

The following restrictions apply to default values for settings:
- only applicable within the scope of a department (site) and for certain modalities;
- assembling is manifest on all levels and can be used to replace classic configuration-specific files.

Overwriting of Configuration Values:

The following restrictions apply to the overwriting of default values for specific settings:
- only applicable within the scope of a site and modality;
- only applicable to the execution settings configuration file;
- substitutions in accordance with default configuration values.

Local/central configuration:

The following definitions apply to local and, in contrast thereto, to central configuration principles:
- online/offline configuration management is supported by SCOB and CONF;
- offline: use of an inbound/outbound queue to obtain/set the configuration data.

In another example embodiment, the configuration management includes online/offline management for enabling one and the same container to be executable both in an operating mode with a network connection and in an operating mode without network connection.

Among other things, the online/offline management thus preferably serves to store information about the status of the network connection. It preferably includes network connection management for determining the status of a network connection, queue management for the persistent management of a queue irrespective of the network status, and cache management for managing a buffer cache for the temporary storage of container data.

The design of the online/offline management strategy requires definitions relating to how applications or activities are managed in order to execute correctly in all cases, either during connection to a network in online mode or disconnected from the network in offline mode. The adaptive client offline application block (SCOB) from Microsoft enables the implementation of this functionality for example. The fundamental principle for this is described in the Microsoft documentation. In addition, online/offline processing can be combined very well with an adaptive client functionality in such a way that the software running on an adaptive client workstation need not be installed. As a result, the computer architecture and an architecture of the workstation according to the invention is able to obtain software without any administrative effort at all. The "UPLOADER" application block enables this function. Part of the adaptive client management includes the above-mentioned so-called "zero administration" which is a new feature. This enables the combination of high user interactivity (which is known from "rich client" applications) with zero administration and functionality released for downloading (known from web applications).

The following features should be noted in this connection:
- supported by the Microsoft UPLOADER application block;
- also works with LINUX-based servers.

Adaptive clients are characterized by a very important feature which is not available for web-based thin clients, namely an online/offline mode. This feature enables clients to execute application logic even if no network connection is available. This functionality is also supported by the SCOB application block for example.

Adaptive clients need to know when they are connected to or disconnected from a network. This functionality is also supported by the SCOB application block. Adaptive clients also need to store results generated by applications persistently in a queue if they are disconnected from the network. The person skilled in the art is likewise familiar with how this functionality can be implemented by way of the SCOB application block for example.

Finally, adaptive clients need to temporarily store application-generated results while they are executing application logic in order to achieve optimal performance. This functionality is supported by the SCOB and cache application blocks as well.

In another example embodiment, one of the services is license management for managing the validity and number of licenses appropriate to the container.

Applications require license management in order to protect configurable functionalities from non-licensed use. It is also possible to use a floating licensing in addition to machine-specific licensing here. Floating licenses include specific requirements for the infrastructure present:
- When an application launches it uses a license from the central license server, if present. This requires the machine on which the application is launched to be connected to the central license server at this point in time.
- Once an application has completed its work and has terminated, it should and must return the license used to the central license server.
- If a system is offline (not connected to the network), and an application is launched, it cannot use the license from the central license manager.
- If a system is offline when a running application (which has a license) is terminated, it cannot return the license used to the central store.
- If a system is online and a running application (which has a license) crashes (that is to say it has no opportunity to return the license used to the central license server), the license is lost for other applications.

These scenarios show on the one hand that floating licenses are perfect for adaptive clients that experience no malfunctions and are continuously online, but on the other hand do not work if adaptive clients are working in offline mode.

In general it will be sensible to lease a floating license for a negotiable period. If necessary, the client must renew the lease before the leased time expires. If the client neither renews nor releases its license, the central license server assumes that the client is offline and has terminated, and increments the number of available licenses again.

In another example embodiment, one of the services is error management for handling errors occurring in the container. In a specific application example, the customary error handling is a native exception handling. In a preferred embodiment, the functionality can be based on the "Enterprise Library" from Microsoft which is a further application block.

The functionality for exception handling is part of the PoP infrastructure services. This version must also support adaptive clients with zero administration features as well as online/offline features. The functionality of the local or central error handling is part of the PoP infrastructure services. In particular, the messages offered to the end users are much improved over the prior art with respect to readability.

In an example embodiment, one of the services may be an M (trace management) for determining and/or recording the progress of program code execution. The definition of this functionality is part of the PoP infrastructure services. The customary trace handling is preferably analogous to that of classic trace handling.

In another example embodiment, one of the services may be usage recording for determining the usage of components of the architecture. The definition of this functionality helps here to understand how the system and its services have been used by customers, and in an example embodiment with implementation with Microsoft products may be part of the Microsoft WMI Management Services. If SYNGO.NET is used, interfaces are provided accordingly by means of the infrastructure service component and the Microsoft Management Console. The predetermined services can always be selected and/or configured.

In a further aspect, at least one embodiment of the invention concerns a mechanism and a method for operating local version-independent infrastructure services with automatic linking to central and remote service infrastructure, and including and automatically supporting both an online and offline processing mode within a generic runtime environment.

In the case of the mechanism according to at least one embodiment of the invention and in the method, the local infrastructure service is preferably configurable and can be accessed from a central directory within a running executable for a using component which uses the mechanism, without said component being dependent on the executable itself. The mechanism consequently does not stand in the way of a "framework standalone deployment".

In the case of the mechanism and the method, a local infrastructure service preferably permits the versioning of components that use it as a service.

In the case of the mechanism and the method, a local infrastructure service preferably permits the online and offline mode of the components that use it as a service.

In the case of the mechanism and the method, the local infrastructure service can preferably cooperate with a central C/S infrastructure service in online mode.

In the case of the mechanism and the method, the local infrastructure service can preferably be applied to the services in a generic container.

BRIEF DESCRIPTION OF THE DRAWINGS

In the description of the FIGURE below, an example embodiment that is not to be understood as restrictive and its features will be discussed with reference to FIG. 1, which shows for the purposes of explanation the basic structure of an embodiment of the software architecture according to the invention.

DETAILED DESCRIPTION OF THE EXAMPLE EMBODIMENTS

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the terms "and/or" and "at least one of" include any and all combinations of one or more of the associated listed items.

In this example embodiment, the software architecture is a container or network-distributed infrastructure 1 respectively, which includes for example, among other things, a Client.dll 2 for calls from application program code (not shown), a further DLL called <IS>.dll 3 for providing services that can be used both by interfaces 4 and "facades" 5 of an interface layer and by functions 6 and 7 of an implementation layer. In addition, an AT.NET Services Manager 8, which is known to the person skilled in the art, is also provided in this specific embodiment.

In a further aspect, an embodiment of the invention concerns a system for program development that has a development environment having a compiler which, during compilation, is intended for linking in a runtime environment for the execution of application program code, of the program code itself and of service program code in an executable container according to an embodiment of the invention. In this aspect of an embodiment of the invention, the generation of the container according to an embodiment of the invention is described and states that it is possible above all to access ready-made blocks which implement the functionalities and which may be identical for every container in the overall system in order to reduce or even minimize programming work and to increase or even maximize the quality of the individual services by virtue of the better error checking that is possible.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A system for program development, comprising:
   a development environment including a compiler implemented on a computer which, during compilation, links in a runtime environment for the execution of application program code, the program code and service program code in an executable application container, wherein the application container is an application that contains standardized parts for the executability of the program code implementing the functionality in at least one of an operating system and an application software family environment, wherein the service program code is for the provision of services usable by the application program code, the service program code being realized as part of an executable of the application container.

2. The system of claim 1, wherein application program code has the standardized interfaces that are identical in a plurality of application containers in the system so as to be useable by the application program code in a uniform manner.

3. The system of claim 1, wherein the application program code and the service program are a single executable file.

* * * * *